C. T. Poulton,
Nut Wrench.
No 68,787.          Patented Sep. 10, 1867.
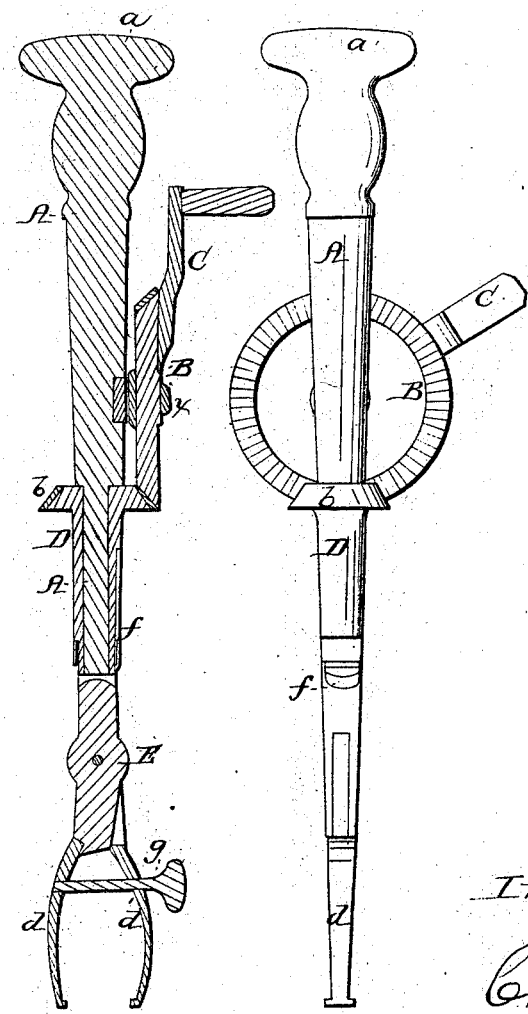
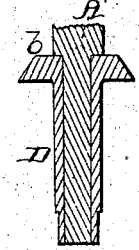
Witnesses:
Inventor;

United States Patent Office.

C. T. POULTON, OF DANBORO, PENNSYLVANIA.

Letters Patent No. 68,787, dated September 10, 1867.

IMPROVED WRENCH.

*The Schedule referred to in these Letters Patent and making part of the same.*

TO ALL WHOM IT MAY CONCERN:

Be it known that I, C. T. POULTON, of Danboro, in the county of Bucks, and in the State of Pennsylvania, have invented certain new and useful improvements in Brace for Boring, Wrenching, &c.; and do hereby declare that the following is a full, clear, and exact description thereof, reference being had to the accompanying drawings and to the letters of reference marked thereon, making a part of this specification.

In the annexed drawings A represents the shank of the brace, which is made straight, and provided with the usual pad $a$ at its top. The lower end of this shank is cut smaller than the main portion, and rounded, as seen at A'. Over this portion of the shank is placed a sleeve, D, having a bevelled cog-wheel, $b$, at its upper end, and provided with a spring, $f$, with a shoulder at its lower end. B represents a large bevelled cog-wheel, secured by means of a pivot, $x$, to the side of the shank A, and provided with a stationary crank, C. By turning this crank it will be seen that the collar or sleeve D is revolved upon its spindle A. The lower extremity of the sleeve D is formed square for placing the loop which secures the bit, so that when thus placed it is held between the shoulder on the spring $f$ and the shoulder on the shoulder. E represents the wrenching device, which is provided with a square loop, as referred to, and connected to the sleeve. This device is provided with two curved metal arms $d\ d'$, and are regulated to catch the nut by means of a set-screw, $g$, passing through their sides. One of these arms is stationed to the metal loop, while the other is pivoted near the centre of the bar, as shown, while each one is provided with a straight bar at its extremity. This brace may be used for boring any kinds of material, and with any sized bit, and being straight in form can be made to operate where others will not.

Having thus fully described my invention, what I claim as new, and desire to secure by Letters Patent, is—

The combination of the wrench E, revolving sleeve D, and spindle A, all constructed and arranged substantially as and for the purposes set forth.

In testimony that I claim the foregoing I have hereunto set my hand this 20th day of March, 1867.

C. T. POULTON.

Witnesses:
JOSEPH B. WALTER,
CHARLES R. SMITH.